(12) United States Patent
Lee (10) Patent No.: US 9,529,605 B2
(45) Date of Patent: Dec. 27, 2016

(54) CUSTOMIZING USER INTERFACE INDICATORS BASED ON PRIOR INTERACTIONS

(71) Applicant: MICROSOFT CORPORATION, Redmond, WA (US)

(72) Inventor: Sang Hoon Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 321 days.

(21) Appl. No.: 14/470,571

(22) Filed: Aug. 27, 2014

(65) Prior Publication Data

US 2016/0062579 A1 Mar. 3, 2016

(51) Int. Cl.
*G06F 3/00* (2006.01)
*G06F 9/44* (2006.01)
*G06F 3/0488* (2013.01)

(52) U.S. Cl.
CPC ......... *G06F 9/4446* (2013.01); *G06F 3/04883* (2013.01); *G06F 2203/04804* (2013.01)

(58) Field of Classification Search
CPC .................................................... G06F 9/4446
USPC ........................................................ 715/708
See application file for complete search history.

(56) References Cited

U.S. PATENT DOCUMENTS

| | | | |
|---|---|---|---|
| 6,606,613 B1 | 8/2003 | Altschuler et al. | |
| 7,197,559 B2 * | 3/2007 | Goldstein | G06F 11/323 709/224 |
| 7,836,401 B2 * | 11/2010 | Hathaway | G06F 9/4446 715/705 |
| 8,156,004 B2 * | 4/2012 | Wajihuddin | G06Q 30/02 463/31 |
| 8,418,085 B2 | 4/2013 | Snook et al. | |
| 8,622,742 B2 | 1/2014 | Benko et al. | |

(Continued)

FOREIGN PATENT DOCUMENTS

| | | |
|---|---|---|
| EP | 1524589 A1 | 4/2005 |
| EP | 2387160 A1 | 11/2011 |

OTHER PUBLICATIONS

Grossman et al., "ToolClips: An Investigation of Contextual Video Assistance for Functionality Understanding", In Proceedings of the SIGCHI Conference on Human Factors in Computing Systems, Apr. 10, 2010, http://www.autodeskresearch.org/pdf/chi2010_toolclips.pdf;10 pages.

*Primary Examiner* — William Titcomb
(74) *Attorney, Agent, or Firm* — Steven Spellman; Tom Wong; Micky Minhas (57) ABSTRACT

A method may provide a customized graphical user interface indicator. The method may include determining a count corresponding to a number of user interactions between a user and a graphical user interface for an application that is executed at a computing device. Based on the count, an appearance of an indicator may be customized. The indicator may provide instructions for interacting with the graphical user interface for the application. Based on a first count, the indicator may be customized to have a first appearance, and based on a second count, the indicator may be customized to have a second appearance, where the first appearance is different from the second appearance. The indicator having a customized appearance may be caused to be displayed concurrently with the graphical user interface for the application.

20 Claims, 6 Drawing Sheets

(56) References Cited

U.S. PATENT DOCUMENTS

| | | | | |
|---|---|---|---|---|
| 8,943,412 B2* | 1/2015 | Needham | ................ | H04L 67/36 715/738 |
| 9,229,917 B2* | 1/2016 | Larcheveque | ...... | G06F 17/2247 |
| 9,367,199 B2* | 6/2016 | Klemenz | ................ | G06F 3/0481 |
| 2002/0198984 A1* | 12/2002 | Goldstein | ............. | G06F 11/323 709/224 |
| 2008/0034329 A1* | 2/2008 | Posner | .................. | G06F 9/4446 715/856 |
| 2008/0081694 A1* | 4/2008 | Hong | ...................... | A63F 13/02 463/34 |
| 2008/0301552 A1* | 12/2008 | Bartek | .................. | G06F 9/4446 715/700 |
| 2010/0229110 A1 | 9/2010 | Rockey et al. | | |
| 2010/0299586 A1* | 11/2010 | Yoo | ........................ | G06F 17/212 715/207 |
| 2011/0119345 A1* | 5/2011 | Chopra | .................. | G06Q 30/02 709/217 |
| 2011/0271185 A1 | 11/2011 | Chen et al. | | |
| 2013/0138450 A1* | 5/2013 | Vigneux | ................. | G06Q 10/00 705/2 |
| 2013/0179188 A1* | 7/2013 | Hyde | ..................... | G06Q 10/10 705/3 |
| 2013/0271456 A1* | 10/2013 | Haswell | ................. | G06T 19/003 345/420 |
| 2013/0271457 A1* | 10/2013 | Haswell | ................. | G06T 19/003 345/420 |
| 2013/0275869 A1* | 10/2013 | Haswell | ................... | G06F 3/048 715/706 |
| 2013/0275886 A1* | 10/2013 | Haswell | ............. | G06Q 30/0241 715/757 |
| 2014/0006944 A1 | 1/2014 | Selig et al. | | |
| 2014/0289054 A1* | 9/2014 | Capel | ................. | G06Q 30/0269 705/14.66 |
| 2015/0301838 A1* | 10/2015 | Steeves | ............. | H04M 3/42051 715/708 |

* cited by examiner

| USER SKILL LEVEL | COUNT THRESHOLD | CUSTOMIZED CONFIGURATION |
|---|---|---|
| BEGINNER | 0-3 | BOLD TEXT INDICATOR & GESTURE INDICATOR |
| | 4-7 | DIM TEXT INDICATOR & GESTURE INDICATOR |
| | 8-9 | DIM GESTURE INDICATOR ONLY |
| | 10+ (TERMINATION) | NO INDICATOR |
| INTERMEDIATE | 0-1 | BOLD TEXT INDICATOR & GESTURE INDICATOR |
| | 2-3 | DIM TEXT INDICATOR & GESTURE INDICATOR |
| | 4 | DIM GESTURE INDICATOR ONLY |
| | 5+ (TERMINATION) | NO INDICATOR |
| ADVANCED | 0 | BOLD TEXT INDICATOR & GESTURE INDICATOR |
| | 1 | DIM TEXT INDICATOR & GESTURE INDICATOR |
| | 2+ (TERMINATION) | NO INDICATOR |

CUSTOMIZING USER INTERFACE INDICATORS BASED ON PRIOR INTERACTIONS

BACKGROUND

Applications include features that may be activated through various user interactions with a user interface for the application. For example, a particular gesture at a touch screen may engage a particular feature of an application. Gestures such as touching, tapping, swiping, and the like may engage such features.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Applications include features that may be activated through various user interactions with a graphical user interface ("GUI") for the application. Often, however, the existence of these features and/or the means for engaging these features may not be readily apparent to a user. Such features may be considered "hidden features." According to embodiments hereof, user interface indicators may alert a user as to the existence of the hidden features, and may further provide guidance for engaging these features. These indicators may be displayed concurrently with the application user interface, such that the application user interface is overlaid with the indicators, for example. The indicators may be displayed in conjunction with the application user interface until it is determined that the user is fully knowledgeable with respect to the existence of the feature and the means for engaging it. For example, it may be determined that a user is fully knowledgeable with respect to the feature after the user has engaged the feature a predetermined number of times. At that point, the indicators may disappear, such that only the application user interface is displayed.

BRIEF DESCRIPTION OF THE DRAWINGS

The present disclosure makes reference to the attached drawing figures, wherein.

DETAILED DESCRIPTION

The subject matter of embodiments hereof is described with specificity herein to meet statutory requirements. However, the description itself is not intended to limit the scope of this patent. Rather, it is contemplated that the claimed subject matter might also be embodied in other ways, to include different steps and/or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

Embodiments hereof provide methods, computer storage media, and systems for, among other things, customizing visual indicators that may be displayed concurrently with a GUI for an application that is executed at a user computing device. Application GUIs often include features that may be activated through various user interactions with the application GUI, such as touch-screen interactions with a touch-screen device that is displaying the GUI. Often, however, the existence of these features and/or the means for engaging these features may not be readily apparent to a user. Such features may considered "hidden features."

Embodiments hereof may provide user interface indicators that are designed to alert a user as to the existence of hidden features, as well as provide guidance for engaging the hidden features. These indicators may be displayed concurrently with the application user interface. For example, these indicators may be displayed while a user is actively engaging with the application (e.g., the user need not enter a "help" or "tutorial" mode). An indicator may be displayed in conjunction with the application user interface until it is determined that the user is fully knowledgeable with respect to the existence of a feature corresponding to the indicator and the means for engaging the feature. For example, it may be determined that a user is fully knowledgeable with respect to the feature after the user has engaged the feature a predetermined number of times. At that point, the indicator may disappear, such that only the application GUI is displayed.

The user interface indicators may be customized based on a number of user interactions with a feature corresponding to an indicator. For example, if a user has not previously interacted with a particular feature, the indicator corresponding to that feature may be prominently displayed (e.g., large, bold text and/or graphics). After the user interacts with that particular feature multiple times, the appearance of the indicator may change. For example, the indicator may be less prominently displayed against the application GUI (e.g., small, light text and/or graphics). Thus, as the user continues to interact with the feature and becomes increasingly familiar with it, the corresponding indicator may be less and less prominently displayed, until it disappears altogether. Thus, when it has been determined that a user is fully knowledgeable with respect to a feature, the corresponding indicator is removed, which may sometimes free up space within the GUI and increase the aesthetic appeal of the GUI.

Advantageously, the customization of user interface indicators based on a number of previous user interactions with an application feature provides a consistent, reliable means of tracking user progress. The customization may ensure that the indicators are tailored to a particular user's needs based on that particular user's progress. Thus, the guidance provided by the customized indicators may increase a user's interaction performance over time. For example, the customized indicators may aid a user in utilizing the full functionality of an application, including time-saving features (e.g., gestures at a touch-screen that engage a shortcut). In this way, the customized indicators may also increase a user's efficiency in interacting with an application.

As an additional advantage, in accordance with embodiments hereof, a user need not actively seek assistance. In fact, a user need not even be aware that a pain point exists. For example, if a user is unaware of a hidden feature, then the user might be unaware that a faster, easier, and/or more convenient alternative to the user's current activities exists. As such, a user might not even know that the user should be seeking assistance. Nonetheless, according to embodiments hereof, such assistance is provided. In this way, customized indicators may increase a user's efficiency and/or performance without a user request for such assistance.

Figure 1:
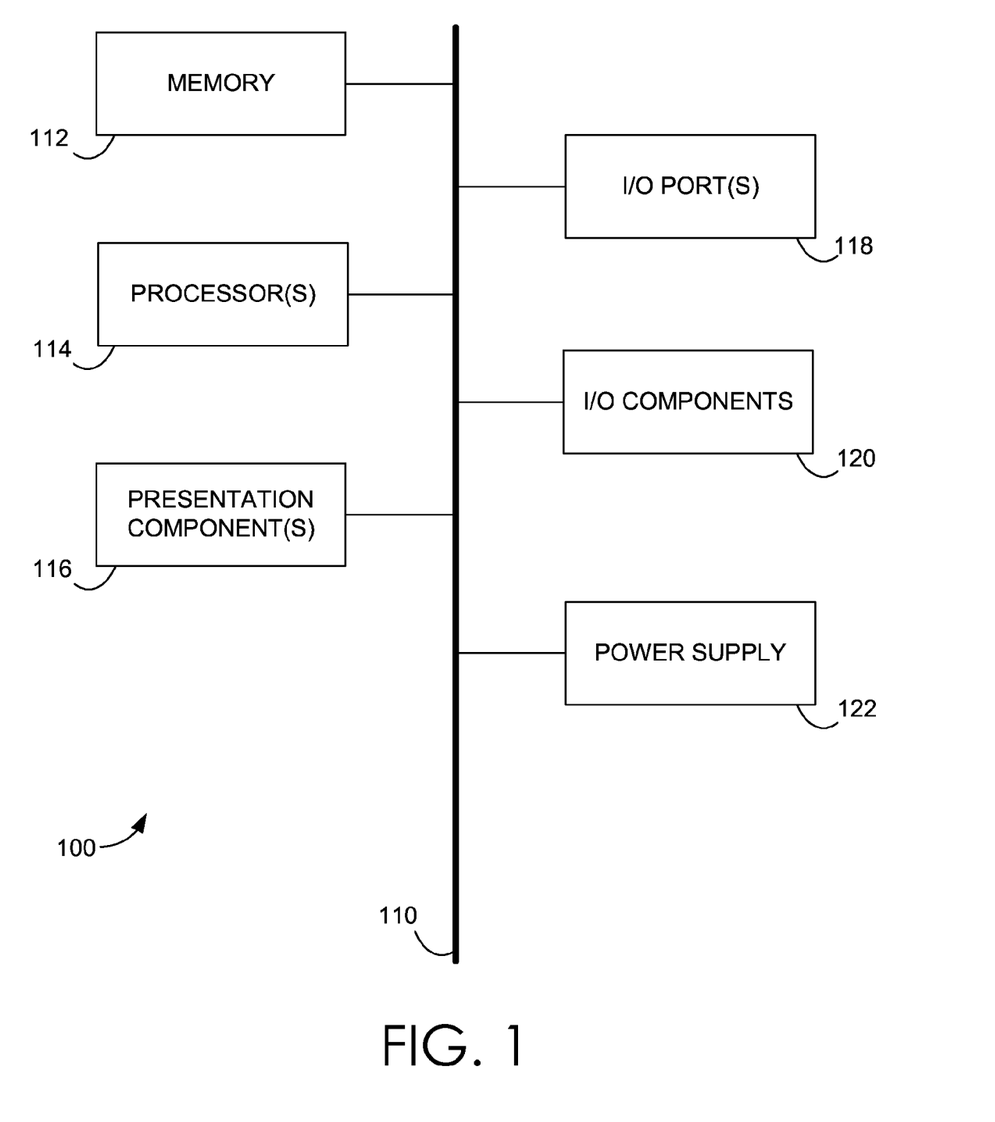
FIG. 1 is a block diagram of an exemplary computing environment.

Turning now to the figures, an exemplary operating environment in which embodiments hereof may be implemented is described below in order to provide a general context for various aspects described herein. Referring initially to FIG. 1, in particular, an exemplary operating environment for implementing embodiments hereof is shown and designated generally as computing device 100. Computing device 100 is but one example of a suitable computing environment and is not intended to suggest any limitation as to the scope of use or functionality hereof. Neither should the computing device 100 be interpreted as having any dependency or requirement relating to any one or combination of components illustrated.

Embodiments hereof may be described in the general context of computer code or machine-useable instructions, including computer-executable instructions such as program modules, being executed by a computer or other machine, such as a personal data assistant, a smart phone, a tablet, or other handheld device. Generally, program modules including routines, programs, objects, components, data structures, etc. refer to code that perform particular tasks or implement particular abstract data types. Embodiments hereof may be practiced in a variety of system configurations, including hand-held devices, consumer electronics, general-purpose computers, more specialty computing devices, etc. Embodiments hereof may also be practiced in distributed computing environments where tasks are performed by remote-processing devices that are linked through a communications network. In a distributed computing environment, program modules may be located in both local and remote computer storage media including memory storage devices.

With reference to FIG. 1, computing device 100 includes a bus 110 that directly or indirectly couples the following devices: memory 112, one or more processors 114, one or more presentation components 116, input/output ("I/O") ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Recognizing that such is the nature of the art, it is reiterated that the diagram of FIG. 1 is merely illustrative of an exemplary computing device that can be used in connection with one or more embodiments hereof. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc. Interactions with the I/O components 120 may be via voice, touch, gestures, a keyboard, a pointing device (e.g., a mouse), and the like.

Figure 2:
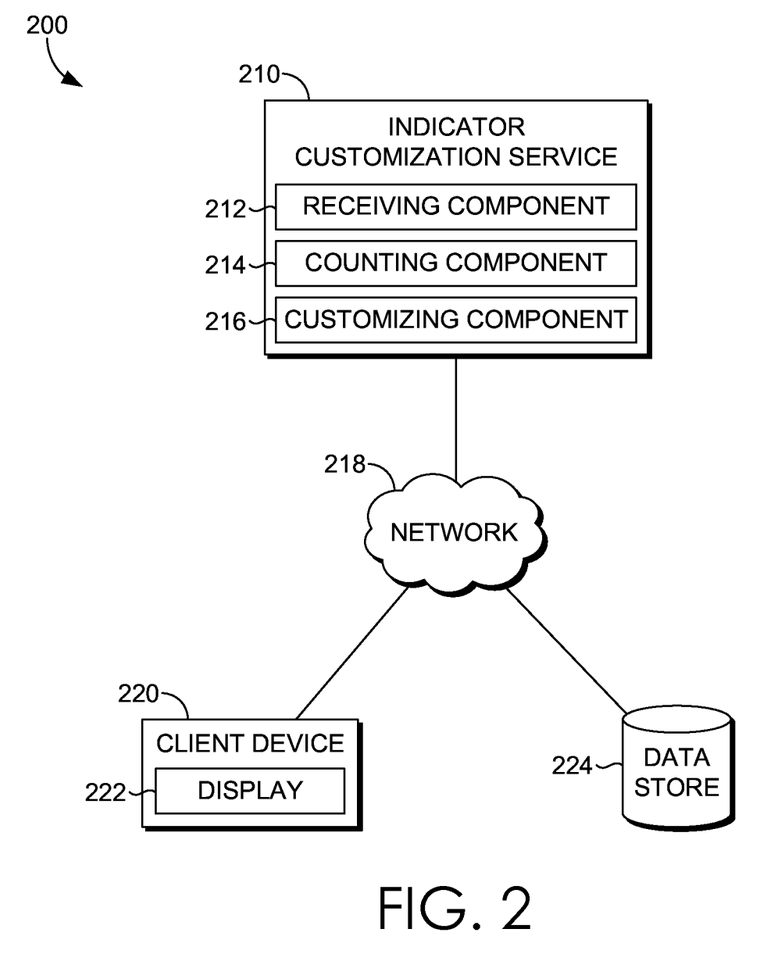
FIG. 2 is a block diagram of an exemplary system for providing customized user interface indicators.

Turning now to FIG. 2, a block diagram depicts an exemplary system 200 suitable for use in implementing embodiments hereof. Generally, the system 200 illustrates an environment that may be used for, among other things, generating a customized indicator that provides directions for interacting with a GUI. Among other components not shown, the system 200 may generally include an indicator customization service 210, a client device 220, and a data store 224, all in communication with one another via a network 218. The network 218 may include, without limitation, one or more local area networks (LANs) and/or wide area networks (WANs). The network 218 may further include a cloud computing network, such as a public cloud, a private cloud, and/or a dedicated cloud. Such networking environments are commonplace in offices, enterprise-wide computer networks, intranets and the Internet.

It will be understood by those of ordinary skill in the art that the components and modules illustrated in FIG. 2 are exemplary in nature and in number and should not be construed as limiting. Any number of components and/or modules may be employed to achieve the functionality described herein. For example, any number of client devices, indicator customization services, data stores, and networks may be employed in the system 200 within the scope of embodiments hereof. Further, components and/or modules may be located on any number of computing devices. Each component and/or module may comprise a single device and/or interface or multiple devices and/or interfaces cooperating in a distributed environment. For instance, multiple devices arranged in a distributed environment may collectively provide the indicator customization functionality described herein. By way of example only, the indicator customization service 210 might be provided on a single server, a cluster of servers, or a computing device, such as the computing device 100 of FIG. 1, remote from one or more of the remaining components. In some instances, the indicator customization service 210, or at least a portion of the components included therein, is provided at the client device 220. Other components and modules not shown may also be included in the system 200.

In some embodiments, one or more of the illustrated components and/or modules may be implemented as stand-alone applications. In further embodiments, one or more of the illustrated components and/or modules may be implemented via a computing device (e.g., the client device 220), as an Internet-based service, and/or as a module within the indicator customization service 210. The phrase "application" or "service" as used herein may broadly refer to any software, or portions of software, that run on top of, or access storage locations within, a computing device and/or multiple computing devices.

It should be understood that this and other arrangements described herein are set forth only as examples. Other arrangements and elements (e.g., machines, interfaces, functions, orders, and/or groupings of functions) can be used in addition to, or instead of, those shown, and some elements may be omitted all together. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions, including the functions described below with respect to the system 200, may be carried out by a processor executing instructions stored in memory.

Turning now to the various components and modules of the system 200, the client device 220 may include any type of computing device, such as the computing device 100 described with reference to FIG. 1. For example, the client device 220 might include a tablet, a smart phone, a personal computer, or any other user computing device. Furthermore, the client device 220 may include any computing device having touch-screen functionality. Generally, the client device may include a display 222, such as a touch-screen display. The client device 220 may execute various applications, and upon such execution, GUIs associated with those applications may be presented at the display 222 of the client device 220. It should be noted that "application" is used broadly herein to refer not only to application software, such as that designed to perform operations for a specific software application, but also system software, such as operating systems.

Applications often include features that may be activated through various user interactions with a GUI associated with the application. As used herein, the term "feature" is broadly used to describe any aspect of an application with which a user may interact by means of a GUI for the application. The term "feature" is intended to include functions of an application that may be associated with user interactions. In some applications, a swiping motion across a touch screen engages a particular feature of the application. Additionally, in other applications, pressing or tapping a particular portion of a touch screen might engage a particular feature. For example, in an electronic-book reader application, pressing the lower right-hand corner of a GUI on a touch screen might engage a forward-page-turning function, while pressing the lower left-hand corner might engage a backward-page-turning function. As an additional example, an operating system may provide interactive GUI features. For example, swiping across the screen in a particular direction may minimize an open application. Other means of user interaction, including touch-screen interactions, that might engage a feature of an application can be imagined and are included within the scope hereof.

In the instances described above, the available features associated with an application might not be readily apparent to a user. For example, the GUI for the electronic-book reader application might not include any indication that a page-turning function may be engaged by pressing a particular portion of the touch screen. In other instances, an icon might be presented, but the significance of the icon might not be intuitive or readily understood by a user. Novice users, in particular, might struggle to discover and/or understand such features. As used herein, "hidden features" may refer to such features that are not readily apparent to, or understood by, a user. In particular, hidden features include features that may be activated by a particular type of user interaction with a touch screen (e.g., a particular type of touch, motion, pattern, and the like). The term "hidden" is used broadly herein to convey the idea that the existence of a feature and/or a particular type of user interaction needed to engage the feature might not be clearly indicated by the GUI for the application. As mentioned, the GUI might provide some indication (e.g., an icon) that a feature is available, but the feature may nonetheless be considered hidden if the indicator provides inadequate notice to a user that the feature is available and/or if the indicator provides insufficient guidance for helping a user understand how to engage the feature.

The indicator customization service 210 may generate indicators that provide a user with guidance regarding hidden features included in an application. These indicators may alert a user as to the existence of a hidden feature in an application, and may further provide instructions for interacting with an application GUI in order to engage the feature. These indicators may be displayed concurrently with the application GUI. For example, the GUI for the application may be overlaid with the indicators, such that the indicators may provide visual guidance for interacting with particular portions of the application GUI.

These indicators that are presented in conjunction with an application GUI may be customized based on any number of factors. For example, customization may be based on a level of user skill. An experienced user may need relatively little guidance in order to become familiar with the features included in a particular application. By contrast, an inexperienced user may need a relatively large amount of guidance. Thus, a user skill level may be determined in order to customize the presentation of an indicator for a particular user. Additionally or alternatively, customization may be based on prior interactions between the user and the application and/or feature corresponding to the indicator. For example, a user who has interacted with a feature many times may need relatively little guidance with respect to that feature, while a user who has not previously interacted with the feature may need relatively more guidance. This customization may include customizing a configuration, such as an appearance, of the indicator. Customization may further include customizing the duration for which the indicator is displayed, the frequency with which the indicator is displayed, the number of times the indicator is displayed, as well as any other means of customization. Such customization is discussed in detail below with respect to the components of the indicator customization service 210.

In order to provide customized indicators, the indicator customization service 210 may include, among other components not shown, a receiving component 212, a counting component 214, and a customizing component 216.

The receiving component 212 may be configured to receive an indication of a user identity for a user that is interacting with an application and/or a particular feature of an application at a device. The user identity indication might include login information for a user. Additionally or alternatively, a particular device may be associated with a particular user. For example, a particular device may be registered to a particular user. In this instance, the receiving component 212 might receive an indication of the device identity, and the user identity may then be determined based on the device identity. Such associations between user identities and user devices may be stored at the data store 224.

The receiving component 212 may further be configured to receive an indication of a user skill level. This skill level may correspond to a user's general comfort level with technology and/or to a user's comfort level with a particular application. The indication of the level of skill may be provided by the user. For example, the user may be prompted to provide a skill level. Such prompting may occur when a user opens an application for the first time, such that the skill level is received in conjunction with a particular application. In this instance, the skill level may be specific to an application (e.g., a user can indicate whether or not the user has any experience with the particular application). Additionally or alternatively, a user skill level may be deemed to apply across all applications currently included on and/or later accessed by the device. This may be accomplished by specifying a skill level within a device settings application, for example. In some instances, a user profile for a particular user of a device may include a field corresponding to a user skill level with respect to the device and/or technology, generally. In some instances, a user may select a skill level (e.g., by a dropdown menu) from a plurality of predefined skill levels. The predefined skill levels might include "beginner," "intermediate," "advanced," as well as any number of other levels corresponding to a relative degree of user skill. If a user does not specify a skill level, the user may be determined to be associated with a beginner skill level by default. User skill levels may be stored in the data store 224.

The receiving component 212 may also be configured to receive an indication of a user interaction with an application. A user interaction may broadly refer to any interaction between a user and an application and/or application feature. For example, an indication of a user interaction may be triggered when the user opens an application. This action may constitute a user interaction with the application, generally, and in some instances, may constitute a user interaction with the features included within that application. In embodiments, the receiving component 212 may receive an indication of a user interaction with a particular feature of an application. This feature-specific indication may be triggered when the user engages the feature by making a gesture, such as a touch-screen gesture. A feature-specific indication might also be triggered by a user viewing a customized indicator corresponding to the feature, such as the customized indicators described herein. Such viewing may be detected through a variety of technologies, including gaze tracking technology. Additionally or alternatively, it may be inferred that a user has viewed the indicator based on a presentation of the indicator at a device associated with the user. Other means for detecting and/or inferring such viewing may be used. Thus, user interactions may range from relatively passive interactions, such as the viewing of an indicator corresponding to a particular feature, to relatively active interactions, such as the performance of a gesture that engages a particular feature.

Based on the indications of user interactions received at the receiving component 212, the counting component 214 may determine a number of user interactions that have occurred between a particular user and a particular application and/or a particular feature of a particular application. For example, when the receiving component 212 receives an indication of a user interaction between a particular user at the client device 220 and a particular feature of an application, the counting component 214 may determine how many times that particular user has interacted with that particular feature of the application, including both previous interactions and the present interaction. A "count" may correspond to this number of user interactions. For example, if the user is accessing the application for the first time, then the count for a particular feature of the application might be 0. As the user interacts with various features included in the application, the count may increase to reflect these interactions. For example, after three interactions with a particular feature, the count for that feature may be 3. User interactions may be tracked according to a particular user and a particular application and/or a particular application feature. If a user is associated with multiple devices, the user interactions for that user may be tracked across devices. Associations between users and devices may be stored at the data store 224, and based on these associations, cumulative counts across user devices may be determined by the counting component 214. In this way, counts may be maintained for multiple applications, as well as multiple features within those applications, across multiple user devices.

The count for a particular application feature may reflect a level of user experience with respect to that feature. For example, each user interaction may be deemed to correspond to additional experience and/or knowledge gained by the user. In some instances, user interactions may be weighted, such that more meaningful interactions are weighted more heavily than less meaningful interactions (as used herein, "meaningful" may broadly refer to an extent of user interaction, a level of user engagement, an amount of effort exerted by a user, and the like). For example, the mere viewing of an indicator corresponding to a particular feature might increase a count by 1, or by some other weighted and/or predetermined increment, while the performance of a gesture that engages the particular feature might increase the count by 2, or by some other weighted and/or predetermined increment. In this way, the count may correspond to a number of user interactions, but the count need not exactly match the number of user interactions that have occurred. In other instances, weighting might not be used, and a counting increment might bear a one-to-one relationship with a user interaction, regardless of the nature of the user interaction. In still further instances, a count might be modified based only on a particular type or types of user interactions. For example, the performance of a gesture that engages a feature might cause the count to be modified, while the mere viewing of an indicator corresponding to the feature might not have any effect on the count.

In all of the examples discussed above, as the count for a particular application feature increases, the user may be deemed to become increasingly comfortable with the feature, including the means by which the user may engage the feature (e.g., the particular gesture needed at the application GUI in order to engage the feature). Thus, the count may be considered a reflection of a user's experience and/or expertise with respect to a feature. Advantageously, the count may serve as a definitive means for measuring and/or evaluating this user experience. Thus, the count may be used to customize the presentation of an indicator that provides instructions for interacting with an application GUI in a way that accounts for the user's current comfort with the application GUI and/or a particular feature of the GUI.

Accordingly, based at least in part on the count for a particular user and a particular feature that is determined by the counting component 214, the customizing component 216 may determine a customized configuration for a user interface indicator. For example, when the count for a particular feature corresponds to a relatively low number of user interactions, the indicator (e.g., a "low-count indicator") may be customized to be highly noticeable. For example, the low-count indicator may be large and bold, such that it is clearly visible against the application GUI. The low-count indicator might be animated and/or accompanied by sound effects in order to attract a user's attention. The low-count indicator might also include a high level of detail regarding the feature and the user interaction needed to engage it (e.g., a text indicator might provide a detailed explanation of the user interaction needed to engage the feature, as will be explained below). By contrast, when the count for that same feature corresponds to a relatively high number of user interactions, such as after the user has engaged the feature multiple times, the indicator (e.g., a "high-count indicator") might be customized to be less noticeable. For example, the high-count indicator might be small and faint, such that it is less visible against the application GUI. The animation and/or sound that might be included in the low-count indicator might be absent from the high-count indicator. Additionally, the level of detail included in the high-count indicator might be reduced, as compared to the low-count indicator. In this way, as the user continues to engage with a particular feature and, thus, continues to gain familiarity with the feature, such that less guidance for using the feature is needed, the indicator may become less prominent.

In some embodiments, a mapping between a count and a customized indicator is provided. For example, a particular count may be mapped to a particular customization. This mapping may be provided for a particular application and/or a particular feature within a particular application. The mapping may also account for variances in user skill levels. For example, the mapping may account for the fact that an advanced user may require fewer interactions with a particular feature in order to gain familiarity with that feature, as compared to a beginner user, who may require more interactions. In some instances, a count threshold corresponds to a particular customized configuration. For example, a first count threshold, such as a low-count threshold, may correspond to one customized appearance, while a second count threshold, such as a high-count threshold, may correspond to a different customized appearance. Details of such mapping will be discussed in greater detail below with respect to FIG. 7.

At some point, after some predetermined number of user interactions, the customizing component 216 may determine that the user has gained sufficient familiarity with the particular application and/or particular application feature, and as such, may determine that the indicator no longer needs to be presented in conjunction with the user interface. This predetermined number of user interactions may correspond to a termination threshold. Upon determining that the number of user interactions satisfies a termination threshold, the presentation of the indicators may be terminated. In accordance with this termination, the application GUI may be presented alone, such that only the application GUI is displayed and the indicators are not displayed. In some instances, determining a customized presentation of a user interface indicator may include an initial determination of whether the indicator is to be displayed at all. Such determination may be based, for example, on a termination threshold. This will be further discussed below.

As mentioned, the indicator customization service 210 and the client device 220 may be in communication with the data store 224 via the network 218. The data store 224 may be configured to store information for use by the indicator customization service 210, for example. In some instances, the information stored in association with the data store 224 may be configured to be searchable. The information stored in association with the data store 224 may comprise general information used by the indicator customization service 210. Specifically, the data store 224 may store user login information, information regarding associations between users and devices, current counts, mappings between counts and customized indicators, count thresholds, as well as any other information that may be used for customizing user interface indicators. The content and volume of such information in the data store 224 are not intended to limit the scope of embodiments hereof in any way. Further, though illustrated as a single, independent component, the data store 224 may be a plurality of storage devices and/or a database cluster. Portions of the data store 224 may reside on a device at which the indicator customization service 210 is located, the client computing device 220, other computing devices, or any combination thereof.

Turning now to FIGS. 3-6, exemplary GUIs are illustrated. Various aspects of the user interface indicators described herein will be discussed with respect to these exemplary GUIs. It should be noted that like reference numerals throughout the set of figures are used to indicate similarly configured components in the various views; however, some aspects of these components sharing like reference numerals may vary according to embodiments hereof.

Figure 3:
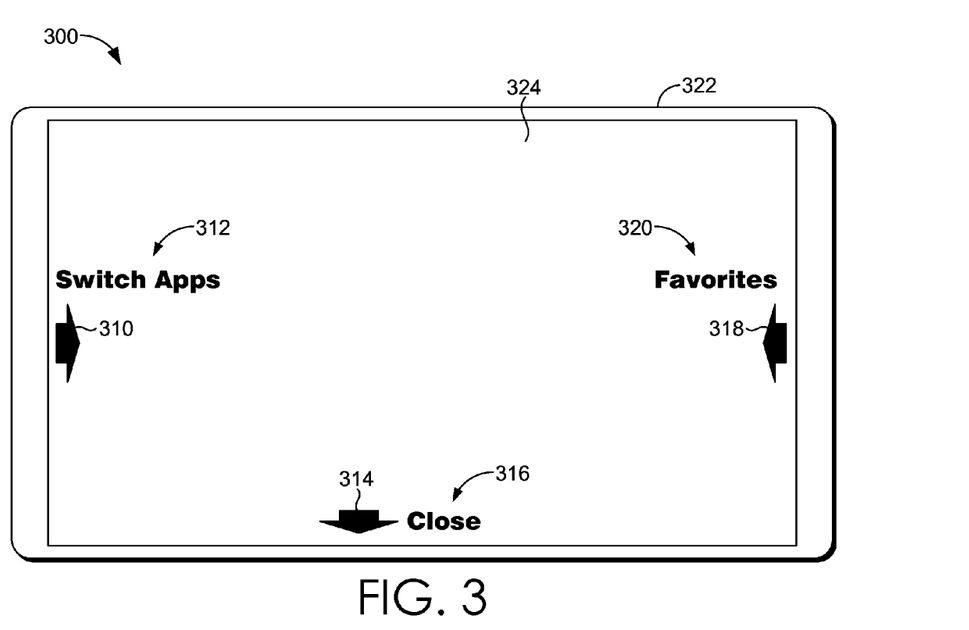
FIG. 3 is an exemplary GUI including customized user interface indicators.

Beginning with FIG. 3, an exemplary GUI 300 is presented at a touch-screen display 324 of a device 322. While the device 322 is depicted as a touch-screen tablet, in embodiments, it may be any computing device, such as the computing device 100 of FIG. 1 and/or the client device 220 of FIG. 2. The GUI 300 includes several exemplary GUI indicators. Indicators may include both a text indicator, such as the text indicator 312, and a gesture indicator, such as the gesture indicator 310. The gesture indicator may be a graphic that represents a type of user interaction needed to interact with the hidden feature. For example, the gesture indicator may include a graphic that corresponds to a motion a user should make on the touch screen. A straight arrow might indicate that a user should swipe in the direction of the arrow. A circular arrow might indicate that a user should make a circular touch motion. A bull's eye might indicate that a user should press and/or tap the location corresponding to the bull's eye. Any number of other graphics corresponding to motions and/or patterns, such as types of touch at a touch screen, can be imagined and are included within the scope hereof.

The user interaction needed to engage a hidden feature may also be described by the text indicator. This may be particularly advantageous if the user interaction is complex, if the graphic corresponding to such interaction is ambiguous, and/or if the user is a novice. The description of the interaction may be advantageous for other reasons, as well. For example, a circular arrow might indicate that a user should swipe the touch screen in a circular motion, or it might also indicate that a user should rotate the device in the direction of the arrow (e.g., rotate the device 90 degrees). In this instance, a text indicator that clarifies the necessary user interaction may be helpful. Similarly, a hidden feature might be activated by two taps in a particular location. A gesture indicator might include a bull's eye, and a text indicator might read, "Tap twice here," in order to provide sufficient instructions for engaging the feature. The text indicator may also describe the hidden feature, itself. For example, the text indicator may include "turn page," "open menu," "next application," "close application," "view favorites," or any number of other descriptions corresponding to hidden features. Any and all such combinations of text indicators, graphic indicators, and other indicators (e.g., count indicators, which are described below) are contemplated as being within the scope hereof.

In the exemplary GUI 300, a gesture indicator 310 is accompanied by a text indicator 312. The gesture indicator 310 includes an arrow pointing to the right, which may indicate to a user that a hidden feature may be activated by swiping to the right across the display 324 of the device 322. The text indicator 312 may describe the hidden feature. For example, the text indicator 312 informs a user that by swiping to the right, in accordance with the gesture indicator 310, the user may switch applications.

As mentioned above, the text indicator 312 may include more detailed instructions for engaging the feature. In one example, the text indicator 312 might state, "Swipe right to switch applications." Also as mentioned above, the indicators may be accompanied by animation and/or sound. For example, the gesture indicator 310 may move across the screen, indicating that the user should follow the arrow across the screen with the user's finger. The gesture indicator 310 might further illustrate a number of fingers to use in making this gesture. Additionally or alternatively, a sound effect may draw a user's attention to the indicator. In one instance, the sound effect might include a narration that describes the feature and/or describes the gesture needed to engage the feature. For example, a voice might state, "Swipe right with one finger to switch applications." In embodiments, the sound effect might include an audible narration of the text included in the text indicator.

By way of further example, the exemplary gesture indicator 314 and the text indicator 316 show that a user may swipe down to close a current application. The exemplary gesture indicator 318 and text indicator 320 show that a user may swipe left to view a "Favorites" menu.

It will be understood that these indicators are merely exemplary in nature and number. For example, any number of gesture indicators and/or text indicators is included within the scope hereof. Furthermore, the indicators may convey additional information to a user. For example, while not shown in FIG. 3, an indicator may further include a count indicator. The count indicator may include a number that corresponds to the number of user interactions that have occurred between the user and the feature represented by the indicator. Additionally or alternatively, the count indicator might include a number that corresponds to the number of user interactions still needed to reach a particular threshold. For example, the count indicator might represent a countdown to a termination threshold or another threshold, as will be discussed with respect to FIG. 7. The count indicator might further include a graphic that illustrates a user's progress. For example, a progress bar might be displayed. When the count is 0, the progress bar might be visually configured to indicate 0% progress. With each subsequent user interaction between the user and the feature represented by the count indicator, the progress bar might be visually configured (e.g., filled with a color) to show the user's relative progress. The progress might be measured with respect to a threshold, such as a termination threshold. For example, just before reaching the termination threshold, the progress indicator might indicate a relative level of progress that is close to 100%. Other count indicators and corresponding graphics can be imagined and are included within the scope hereof.

Figure 4:
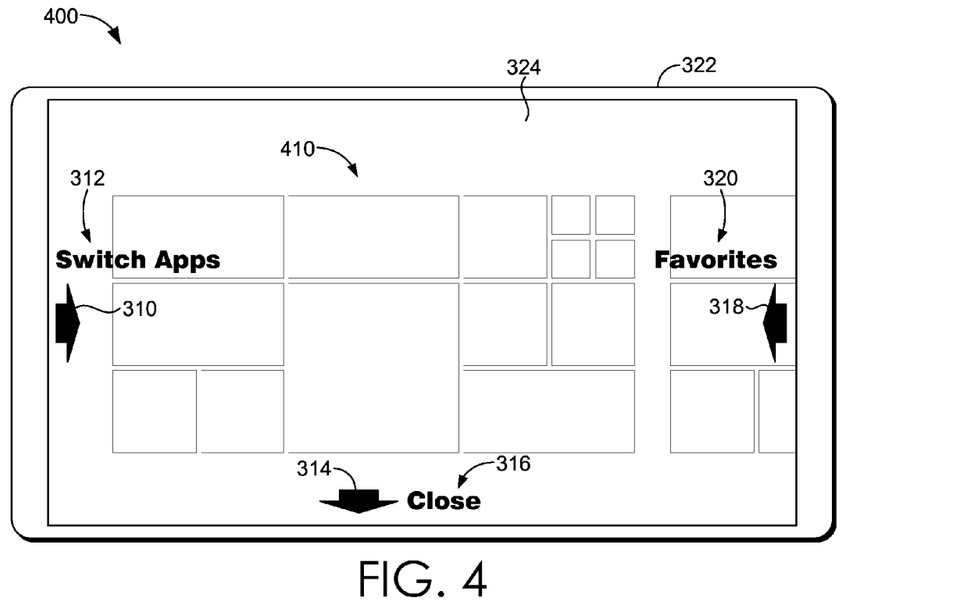
FIG. 4 is an exemplary GUI including customized user interface indicators that are displayed concurrently with an application GUI.

In the exemplary GUI 400 of FIG. 4, the indicators discussed above are presented concurrently with an application GUI 410. For example, the application GUI 410 may be overlaid with the indicators. Advantageously, this concurrent presentation of the application GUI 410 and the indicators 310, 312, 314, 316, 318, and 320 may increase GUI functionality without sacrificing any space within the GUI. For example, by presenting the indicators on top of the application GUI 410, a tutorial regarding application features is provided, but the size of items included in the application GUI 410 remains the same. Thus, more information may be presented in the same amount of space. As an additional advantage, the user interface indicators may be displayed while a user is actively engaging with the application (e.g., the user need not enter a "help" or "tutorial" mode).

As shown, the exemplary indicators included in the GUI 400 correspond to hidden features of an application, because the application GUI 410, itself, provides no indication of these features. Thus, absent the indicators 310, 312, 314, 316, 318, and 320, a user who is unfamiliar with the application might be unaware of the existence of these features and/or the means for engaging these features.

The indicators 310, 312, 314, 316, 318, and 320 may represent indicators that are customized based on a count corresponding to a low number of user interactions with the application and/or a particular feature of the application. These indicators are bold and readily noticeable against the application GUI 410. Thus, these prominently displayed indicators may be desirable for a user that is not yet familiar with the application features.

Figure 5:
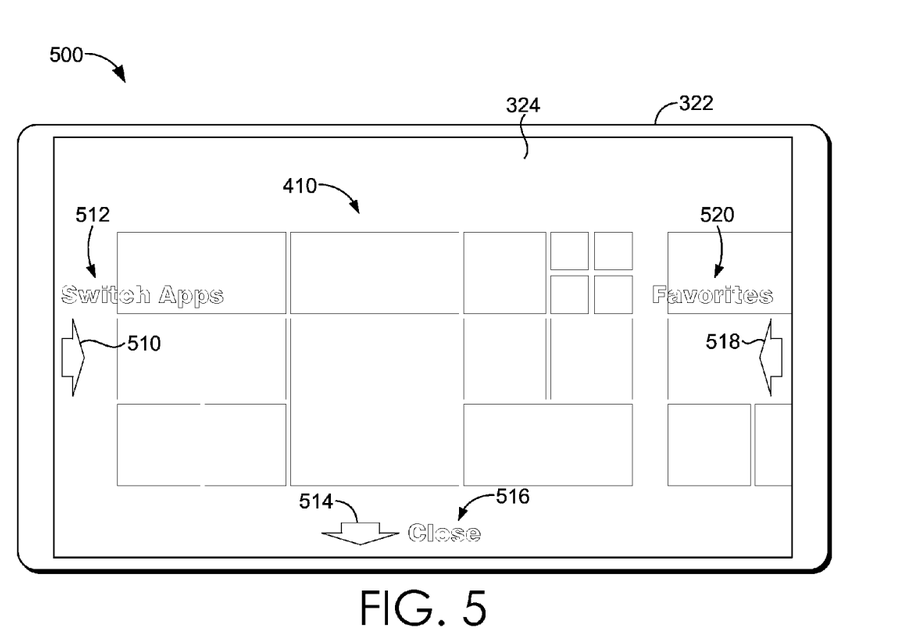
FIG. 5 is an exemplary GUI including customized user interface indicators that are displayed concurrently with an application GUI.

The exemplary GUI 500 of FIG. 5 includes indicators 510, 512, 514, 516, 518, and 520. These indicators are dimmer than the indicators 310, 312, 314, 316, 318, and 320 and are therefore less noticeable against the application GUI 410. Thus, these may represent indicators that are customized based on a count corresponding to a high number of user interactions with the application and/or a particular feature of the application. The configuration of the indicators may be customized in any number of ways. The dimming effect illustrated from FIG. 4 to FIG. 5 is just one such example. In other examples, as the number of user interactions with a particular feature increases, the corresponding indicator may change in color (e.g., progress from a bright color to a dull color, such as by greying out), level of brightness (e.g., bright to dull), level of transparency (e.g., opaque to transparent), size (e.g., large to small), level of detail (e.g., detailed textual indicator to brief textual indicator), and the like. The indicators may also change in shape. In some instances, a low-count indicator might include a detailed depiction of the gesture needed to engage a feature. For example, a graphic might display the number of fingers needed to engage the feature. As the number of user interactions with the feature increases, the indicator might change to a simple graphic that does not indicate the number of fingers to be used, as it may be determined that the user has learned the correct number of fingers to use, based on the number of previous user interactions with the feature.

As illustrated by the exemplary GUIs of FIGS. 3-5, a location at which an indicator is displayed on an application GUI may correspond to a location of a particular application feature. In some instances, the location at which the indicator is displayed may correspond to a location on the application GUI at which the user should perform a particular gesture in order to engage a particular hidden feature. For example, an indicator that instructs a user to "tap here" might be displayed at the specific location and/or region at which a user should tap in order to engage the feature. As mentioned, indicators may be animated. In this instance, an indicator may pass through various locations on an application GUI. A beginning location may correspond to a location at which the user should begin a gesture, and an ending location may correspond to a location at which the user should end the gesture. Intervening locations may correspond to the particular type of motion and/or pattern that a user's gesture should imitate.

Figure 6:
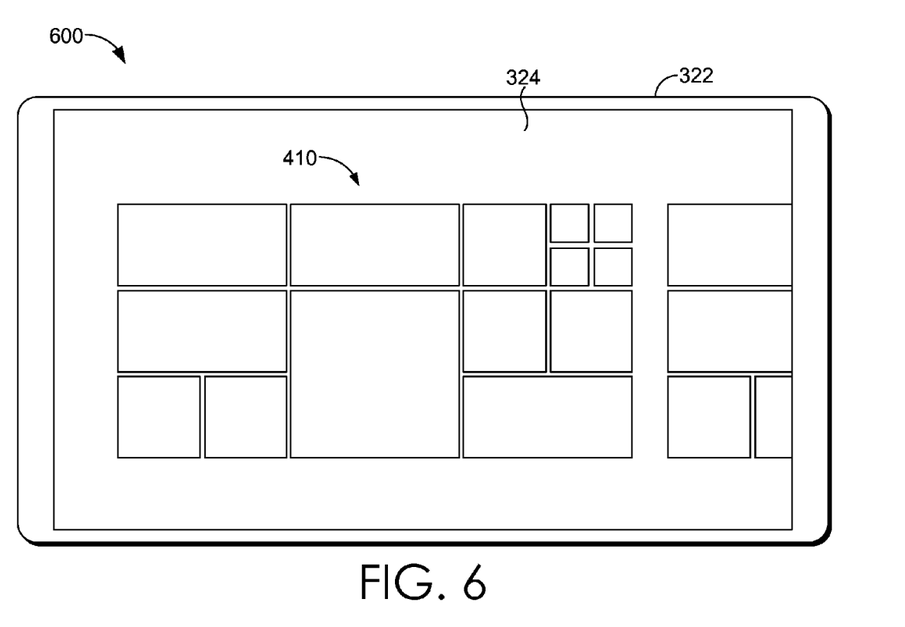
FIG. 6 is an exemplary GUI for an application.

The exemplary GUI 600 of FIG. 6 illustrates the application GUI 410 without any user interface indicators. The GUI 600 may correspond to a GUI that is presented when a count satisfies a termination threshold, as described above. For example, after a predetermined number of user interactions, it may be determined that the user has gained sufficient familiarity with the particular application and/or particular application feature, and as such, it may be determined that the indicator no longer needs to be presented in conjunction with the application GUI. Thus, the application GUI 410 may be presented alone, such that only the application GUI 410 is displayed and the indicators are not displayed.

It should be noted that while FIGS. 3-6 illustrate uniform changes among the indicators (e.g., from FIG. 4 to FIG. 5, all indicators are dimmed, and from FIG. 5 to FIG. 6, all indicators disappear), in embodiments, each indicator may be customized individually. For example, based on a count corresponding to the number of user interactions with the feature for switching applications, the indicators 310 and 312 may be individually customized. Similarly, based on a count corresponding to the number of interactions with the feature for closing an application, the indicators 314 and 316 may be individually customized. Thus, the indicators 310 and 312 may be dimmed, while the indicators 314 and 316 may remain bold. Additionally, the indicators 318 and 320 may disappear, such that they are no longer presented on an application GUI, while the other indicators may remain on display. In this way, each indicator for each feature may be individually customized.

Figure 7:
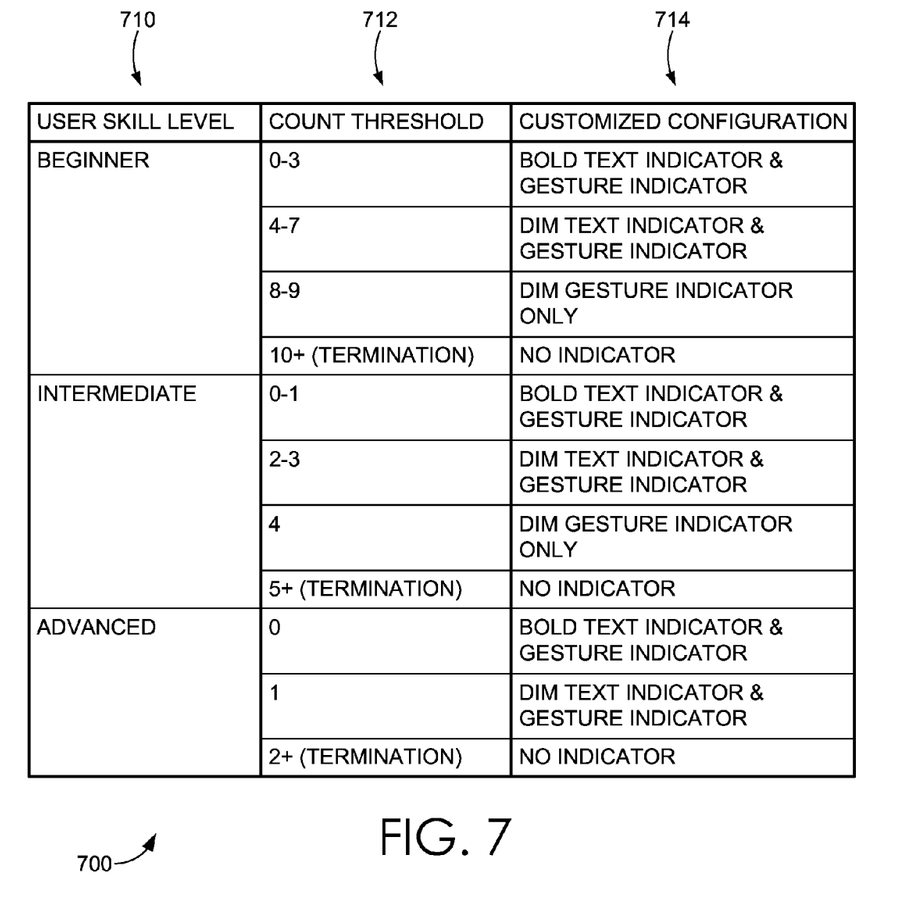
FIG. 7 is an exemplary mapping for determining a customized configuration for user interface indicators.

Turning now to FIG. 7, an exemplary mapping 700 among a user skill level 710, a count threshold 712, and a customized configuration 714 for a user interface indicator is illustrated. As shown in the mapping 700, a customized configuration 714 for an indicator may be tailored to a particular user based both on a user skill level 710 and on a count threshold 712. In some instances, the count threshold may include a count range. In other instances, each distinct count may correspond to a count threshold, such that each count corresponds to a unique indicator configuration.

By way of example only, an indicator may be customized for a user having a beginner skill level. The user's skill level may be based on user-provided information, as described above with respect to the receiving component 212 of FIG. 2. When a number of user interactions with an application and/or a particular feature of an application is determined, such as by the counting component 214 of FIG. 2, the count may be compared to the count threshold 712. If, for example, a beginner user is opening an application for the first time and the count for a particular feature of the application is 0, the customized configuration for an indicator of that feature may be determined to include a bold text indicator and a bold gesture indicator, such as the indicators 310, 312, 314, 316, 318, and 320 of FIGS. 3-4. As the beginner user continues to utilize the application and the count for the particular feature increases, such as increasing to a count of 5, then when the indicator is next presented, the customized configuration may be determined to be a dim text indicator and a dim gesture indicator. For example, the customized configuration may resemble the appearance of the indicators 510, 512, 514, 516, 518, and 520 of FIG. 5.

As shown in the exemplary mapping 700, as the number of user interactions increases, the customization of the user interface indicators may be altered, such that the appearance of an indicator changes with subsequent user interactions. For example, after a beginner user reaches 8 interactions with an application and/or a particular feature of an application, then the next time the indicator is presented, the text indicator might be removed, such that only a gesture indicator is presented. Then, after a beginner user reaches a count of 10, a termination threshold may be satisfied and the presentation of the indicator might be terminated altogether, such that no indicator is presented. In this way, the indicator may be considered a disappearing indicator, as its appearance may be configured to become less and less noticeable and/or prominent, until the indicator disappears altogether.

The count thresholds and associated customizations may vary for users having different skill levels. For example, a user having an intermediate skill level might need fewer interactions with an application feature in order to become comfortable with the feature than a user having a low skill level might need to become comfortable with the same feature. This is illustrated by the exemplary mapping 700, where the customization of indicators progresses more quickly than does the progression for beginner users (e.g., the indicator becomes less noticeable over fewer interactions, as compared to the mapping for a beginner user). This is further illustrated by the exemplary mapping for an advanced user, where an indicator may be prominently displayed only prior to a first interaction, and where a termination threshold might correspond to only two user interactions.

The mapping 700 is one example of how the customization of indicators might be performed. In other examples, a user might specify a particular number of interactions that are desired. For example, a user might specify that 10 interactions are desired before reaching a first threshold, and that 30 interactions are desired before reaching a termination threshold. Additionally or alternatively, a user may request a particular level of instruction, such as a low, medium, or high level of instruction. A number of user interactions may be mapped to each level of instruction, such that the interaction thresholds (and consequently, the indicator configurations) are customized based on the user's request. In this way, a user can further customize the indicators to the user's individual needs.

As previously mentioned, a user's interactions may be tracked across a variety of devices associated with the user. For example, a user may open an application for the first time at a smart phone associated with the user, and the user may interact with a particular feature through a touch screen of the user's smart phone. Thus, the count for that feature may increase to 1, for example. A user may then open an analogous application at a tablet associated with the user, and upon interacting with an analogous feature through a touch screen of the user's tablet, the count may increase to 2, for example. When the user again opens the smart phone application, the count may be set at 2, based on the interaction at the tablet. The count may thus be maintained across multiple devices. In this way, the count may reflect a cumulative number of user interactions, independent of a particular device.

The term "analogous application" may be used broadly to describe a related application that is tailored to a particular device and/or a particular operating system running on a particular device. For example, two analogous applications might be two different versions of the same application, such as an electronic-book reader designed for a smart phone and an electronic-book reader designed for a tablet. Additionally or alternatively, two analogous applications might include a first application that is designed for a first operating system and a second application that is designed for a second operating system, where the first and second operating systems are different operating systems. In this instance, a mapping may be created that maps features in one application to analogous features in an analogous application, such that an accurate count of user interactions may be kept across all devices associated with a user. User login information may be used to track the activities of a particular user across devices. Additionally or alternatively, a set of devices associated with a user may be determined, and this information may be stored (e.g., in a data store, such as the data store 224 of FIG. 2) and later accessed for purposes of tracking user activities across devices.

Related features among different applications might also be mapped to one another. For example, two different applications might provide a feature that enables a user to open a favorites menu by swiping left. Thus, as the user performs the gesture in one application, this learning may translate to the other application. Even though the two applications may be entirely unrelated, a similarity in features may be recognized, and based on this similarity, a user interaction with the feature in the first application may cause a modification of a count for that feature in both the first application and the second application. Additionally, when a new application is downloaded, and the new application includes features similar to those already mastered by the user in the context of a different application, a count threshold for the new application might be adjusted to account for the user's prior experience with a similar feature in a different application.

The customized indicators described herein may be further customized based on a variety of user preferences. For example, a user may choose to disable and/or opt out of indicators for a particular application, as well as to disable and/or opt out of the indicators altogether. A user may opt out at the application level, such as within the settings for a particular application. Additionally or alternatively, a user may opt out at a system level, such as within a general settings application for a device and/or user account. For example, a user might opt out at an operating-system level such that the user interface indicators are disabled across all applications associated with the operating system.

It should be understood that while the above description refers to user gestures for engaging application features at a touch screen, embodiments hereof might also include user interface indicators that provide instructions for interacting with an application via other means of user input at other types of user devices. For example, user interface indicators might provide guidance for engaging a hidden feature by controlling a cursor on a laptop and/or desktop computer. Such variations are included within the scope hereof.

Figure 8:
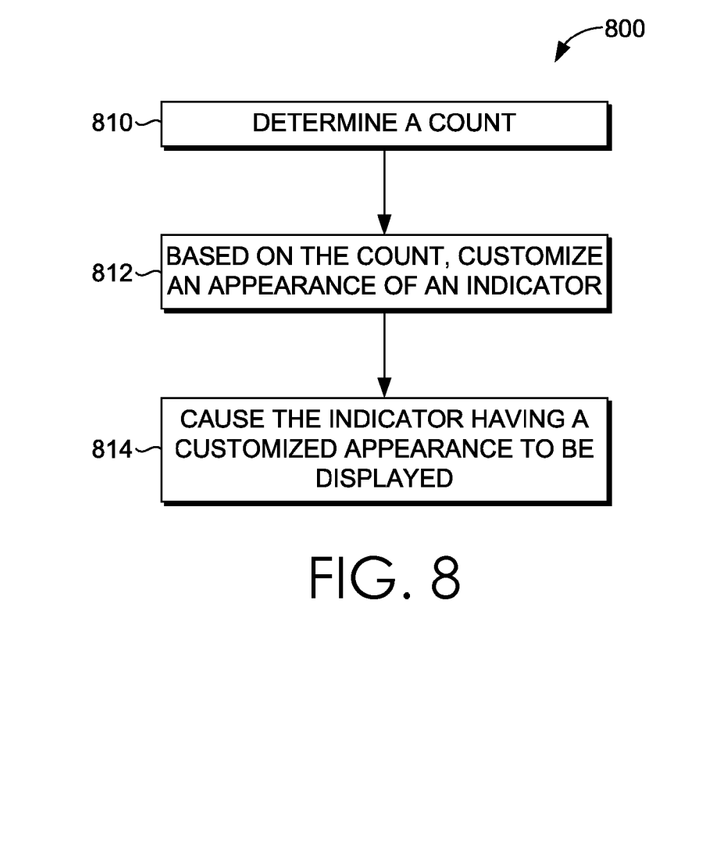
FIG. 8 is a flow diagram that illustrates an exemplary method for providing a customized user interface indicator.

Turning now to FIG. 8, a flow diagram illustrates an exemplary method 800 for providing a customized user interface indicator. At block 810, a count is determined. This determination may be made by a component like the counting component 214 of FIG. 2. The count may correspond to a number of user interactions between a user and a GUI for an application that is executed at a computing device. In some instances, the count may correspond to a number of user interactions between the user and a particular feature of the application.

Based on the count, at block 812, an appearance of an indicator may be customized. This customization may be performed by a component like the customizing component 216 of FIG. 2. The indicator may provide instructions for interacting with the GUI for the application. For example, based on a first count, the indicator may be customized to have a first appearance. Then, based on a second count, the indicator may be customized to have a second appearance, where the second appearance is different from the first appearance. The customization may be based on a level of user instruction requested by the user.

In some instances, the count may include a text indicator, a gesture indicator, and a count indicator. The text indicator may correspond to a description of the particular feature corresponding to the count. The gesture indicator may correspond to a touch motion associated with the particular feature. The count indicator may correspond to the number of user interactions between the user and the particular feature. For example, the count indicator might provide an indication of the number of user interactions needed to reach a particular threshold.

At block 814, the indicator having a customized appearance is caused to be displayed. Such display may be caused by a component like the customizing component 216 of FIG. 2. The indicator having the customized appearance may be displayed concurrently with the GUI for the application. In particular, the indicator may be displayed at a location associated with the particular feature corresponding to the count.

Figure 9:
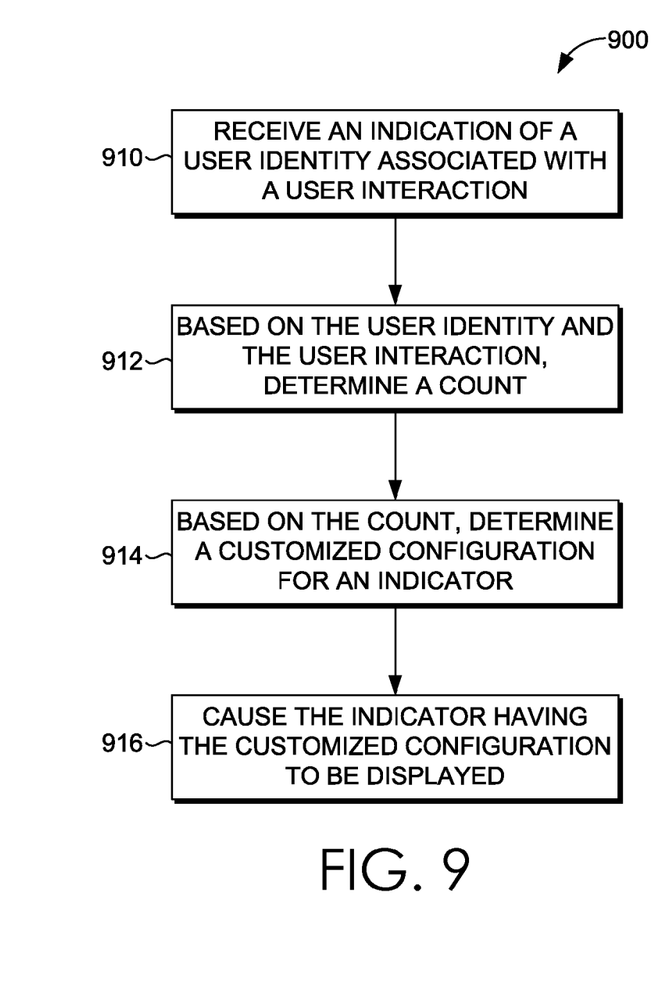
FIG. 9 is a flow diagram that illustrates an exemplary method for customizing user interface indicators.

Turning now to FIG. 9, a flow diagram illustrates an exemplary method 900 for customizing user interface indicators. At block 910, an indication of a user identity associated with a user interaction is received. This receiving may be performed by a component like the receiving component 212 of FIG. 2. The user interaction may be an interaction between a user and a hidden feature associated with a GUI for an application that is executed at a first computing device associated with the user.

Based on the user identity and the user interaction, at block 912, a count may be determined. The determination may be made by a component like the counting component 214 of FIG. 2. The count may correspond to a number of user interactions between the user and the hidden feature.

Then, at block 914, based on the count, a customized configuration for an indicator may be determined. This customization may be performed by a component like the customizing component 216 of FIG. 2. The indicator may provide directions for interacting with the hidden feature. The indicator may include a text indicator and a gesture indicator. The text indicator may include a description of the hidden feature and the gesture indicator may include a touch pattern for engaging the hidden feature.

Determining the customized configuration for the indicator may include determining a first customized configuration for the indicator based on the count satisfying a first count threshold, and determining a second customized configuration, which is different from the first customized configuration, for the indicator based on a second count threshold. In some instances, satisfying the first count threshold may include falling within a first count range, and satisfying the second count threshold may include falling within a second count range.

Determining the customized configuration for the indicator may include determining a customized color for the indicator, a customized level of brightness for the indicator, and a customized shape for the indicator.

At block 916, the indicator having the customized configuration may be caused to be displayed concurrently with the GUI for the application. For example, the indicator having the customized configuration may be displayed at a location that is associated with the hidden feature. The location associated with the hidden feature may be a touch location for engaging the hidden feature.

In embodiments, the method may further include determining the indicator is not to be displayed based on the count satisfying a termination threshold. In some instances, the first count threshold, the second count threshold, and the termination threshold may be based on a level of skill associated with the user. This level of skill may be specified by the user.

In additional embodiments, the method may further include receiving an indication of a subsequent user interaction between the user and the hidden feature, where the subsequent user interaction occurs at a second computing device associated with the user. Based on the received indication of the subsequent user interaction at the second computing device, the count corresponding to the number of user interactions between the user and the hidden feature may be modified.

The components that may perform the steps described above with respect to FIGS. 8-9, such as the receiving component 212, the counting component 214 and the customizing component 216 of FIG. 2, may be remote from the device at which the indicator is displayed. Additionally or alternatively, some or all of these components may reside on the device at which the indicator is displayed.

In accordance with the aspects described above, in one embodiment, a method for providing a customized graphical user interface indicator is provided. The method may include determining a count corresponding to a number of user interactions between a user and a graphical user interface for an application that is executed at a first computing device. The method may further include, based on the count, at a processor of a second computing device (which may be the same as, or different from, the first computing device), customizing an appearance of an indicator that provides instructions for interacting with the graphical user interface for the application. For example, based on a first count, the indicator may be customized to have a first appearance, and based on a second count, the indicator may be customized to have a second appearance, where the first appearance is different from the second appearance. The method may also include causing the indicator having a customized appearance to be displayed concurrently with the graphical user interface for the application.

In an additional embodiment, one or more computer storage media are provided. The one or more computer storage media may have computer-executable instructions embodied thereon that, when executed by a computing device having a processor and a memory, cause the computing device to perform a method for customizing graphical user interface indicators. The method may include receiving an indication of a user identity associated with a user interaction between a user and a hidden feature associated with a graphical user interface for an application that is executed at a first computing device associated with the user. The first computing device associated with the user may be the same as, or different from, the computing device having the processor and the memory that execute the computer-executable instructions embodied on the one or more computer storage media. Based on the user identity and the user interaction, the method may further include determining a count corresponding to a number of user interactions between the user and the hidden feature. Based on the count, the method may additionally include determining a customized configuration for an indicator that provides directions for interacting with the hidden feature. The method may also include causing the indicator having the customized configuration to be displayed concurrently with the graphical user interface.

In yet another embodiment, a system is provided. The system may include one or more processors and one or more computer storage media storing a plurality of computer software components executable by the one or more processors. The plurality of computer software components may include a receiving component that is configured to receive an indication of a user interaction between a user and a graphical user interface for an application that is executed at a computing device. A counting component may also be included. The counting component may be configured to determine, based on the received indication of the user interaction, a count corresponding to a number of interactions between the user and the graphical user interface for the application. The software components may additionally include a customizing component that is configured to determine, based on the count, a customized configuration for an indicator that is displayed concurrently with the graphical user interface and that provides guidance for interacting with the graphical user interface.

From the foregoing, it will be seen that embodiments hereof are well adapted to attain all the ends and objects hereinabove set forth together with other advantages obvious and inherent to the structure. It will be understood that certain features and sub-combinations are of utility and may be employed without reference to other features or sub-combinations. This is contemplated by and is within the scope of the claims.

Aspects hereof have been described in relation to particular embodiments, which are intended in all respects to be illustrative rather than restrictive. Alternative embodiments will become apparent to those of ordinary skill in the art without departing from the scope hereof.

What is claimed is:

1. A computer-implemented method for providing a customized graphical user interface indicator, the method comprising:
   determining a count corresponding to a number of user interactions between a user and a graphical user interface for an application that is executed at a first computing device;
   based on the count, at a processor of a second computing device, customizing an appearance of an indicator that provides instructions for interacting with the graphical user interface for the application, wherein based on a first count, the indicator is customized to have a first appearance, and based on a second count, the indicator is customized to have a second appearance, wherein the first appearance is different from the second appearance; and
   causing the indicator having a customized appearance to be displayed concurrently with the graphical user interface for the application.

2. The method of claim 1, wherein the count corresponds to a number of user interactions between the user and a particular feature of the application.

3. The method of claim 2, wherein the indicator having the customized appearance is displayed at a location associated with the particular feature.

4. The method of claim 3, wherein the indicator comprises a text indicator, a gesture indicator, and a count indicator.

5. The method of claim 4, wherein the text indicator corresponds to a description of the particular feature, the gesture indicator corresponds to a touch motion associated with the particular feature, and the count indicator corresponds to the number of user interactions between the user and the particular feature.

6. The method of claim 1, wherein customizing the appearance of the indicator is based on a level of instruction requested by the user.

7. One or more computer storage media having computer-executable instructions embodied thereon that, when executed by a computing device having a processor and a memory, cause the computing device to perform a method for customizing graphical user interface indicators, the method comprising:
   receiving an indication of a user identity associated with a user interaction between a user and a hidden feature associated with a graphical user interface for an application that is executed at a first computing device associated with the user;
   based on the user identity and the user interaction, determining a count corresponding to a number of user interactions between the user and the hidden feature;
   based on the count, determining a customized configuration for an indicator that provides directions for interacting with the hidden feature; and
   causing the indicator having the customized configuration to be displayed concurrently with the graphical user interface.

8. The one or more computer storage media of claim 7, wherein determining the customized configuration for the indicator comprises:
   based on the count satisfying a first count threshold, determining a first customized configuration for the indicator; and
   based on the count satisfying a second count threshold, determining a second customized configuration for the indicator.

9. The one or more computer storage media of claim 8, wherein the method further comprises, based on the count satisfying a termination threshold, determining the indicator is not to be displayed.

10. The one or more computer storage media of claim 9, wherein the first count threshold, the second count threshold, and the termination threshold are based on a level of skill associated with the user.

11. The one or more computer storage media of claim 8, wherein satisfying the first count threshold comprises falling within a first count range and satisfying the second count threshold comprises falling within a second count range.

12. The one or more computer storage media of claim 7, wherein the method further comprises:
   receiving an indication of a subsequent user interaction between the user and the hidden feature, wherein the subsequent user interaction occurs at a second computing device associated with the user; and
   based on the received indication of the subsequent user interaction at the second computing device, modifying the count corresponding to the number of user interactions between the user and the hidden feature.

13. The one or more computer storage media of claim 7, wherein causing the indicator having the customized configuration to be displayed concurrently with the graphical user interface comprises causing the indicator having the customized configuration to be displayed at a location that is associated with the hidden feature.

14. The one or more computer storage media of claim 13, wherein the location that is associated with the hidden feature is a touch location for engaging the hidden feature.

15. The one or more computer storage media of claim 7, wherein the indicator comprises a text indicator and a gesture indicator.

16. The one or more computer storage media of claim 15, wherein the text indicator comprises a description of the hidden feature and the gesture indicator comprises a touch pattern for engaging the hidden feature.

17. The one or more computer storage media of claim 7, wherein determining the customized configuration for the indicator comprises determining a customized color for the indicator.

18. The one or more computer storage media of claim 7, wherein determining the customized configuration for the indicator comprises determining a customized level of brightness for the indicator.

19. The one or more computer storage media of claim 7, wherein determining the customized configuration for the indicator comprises determining a customized shape for the indicator.

20. A system comprising:
   one or more processors; and
   one or more computer storage media storing computer-executable instructions that, when executed by the one or more processors, are configured to implement a method, the method comprising:

receiving an indication of a user interaction between a user and a graphical user interface for an application that is executed at a computing device, determining, based on the received indication of the user interaction, a count corresponding to a number of interactions between the user and the graphical user interface for the application, determining, based on the count, a customized configuration for an indicator that is displayed concurrently with the graphical user interface and that provides guidance for interacting with the graphical user interface, and providing for presentation the indicator having the customized configuration.

\* \* \* \* \*